United States Patent [19]

Smith et al.

[11] Patent Number: 5,613,728
[45] Date of Patent: Mar. 25, 1997

[54] VEHICLE CAB WITH ROOF HATCH

[75] Inventors: Derek J. Smith, Sutton Coldfield; John C. Higgins, Nr. Rugby, both of Great Britain

[73] Assignee: Massey Ferguson Manufacturing Limited, United Kingdom

[21] Appl. No.: 314,549

[22] Filed: Sep. 28, 1994

Related U.S. Application Data

[63] Continuation of Ser. No. 40,294, Mar. 30, 1993, abandoned.

[30] Foreign Application Priority Data

Apr. 4, 1992 [GB] United Kingdom ................ 9207406

[51] Int. Cl.$^6$ .......................... B60J 7/00; B60J 7/185
[52] U.S. Cl. ................ 296/219; 296/224; 160/233; 292/259 R
[58] Field of Search .......................... 296/216, 219, 296/37.7, 218, 224; 160/210, 233, 213, 218, 229.1; 292/259

[56] References Cited

U.S. PATENT DOCUMENTS

| | | | |
|---|---|---|---|
| 313,942 | 3/1985 | Knauer | 292/259 |
| 1,860,463 | 5/1932 | Kaplan et al. | 296/219 |
| 1,928,306 | 9/1933 | Brennan | 296/216 X |
| 3,041,099 | 6/1962 | Stewart | 292/259 |
| 4,813,736 | 3/1989 | Schubert et al. | 296/190 |
| 5,054,846 | 10/1991 | Simin et al. | 296/219 X |
| 5,248,278 | 9/1993 | Fuerst et al. | 454/129 |
| 5,344,159 | 9/1994 | Powell | 160/213 X |

FOREIGN PATENT DOCUMENTS

| | | | |
|---|---|---|---|
| 638173 | 5/1928 | France | 296/219 |
| 1241859 | 4/1960 | France | 296/216 |
| 802907 | 2/1951 | Germany | 296/216 |
| 1111964 | 7/1961 | Germany | 296/219 |
| 1259216 | 1/1968 | Germany | 296/216 |
| 570745 | 12/1957 | Italy | 296/219 |
| 255601 | 7/1926 | United Kingdom | 296/216 |

*Primary Examiner*—Dennis H. Pedder
*Attorney, Agent, or Firm*—MacMillan, Sobanski & Todd

[57] ABSTRACT

A vehicle cab with a roof hatch (12) which comprises front and rear hatch sections (14) and (16), the rear section (14) being over an escape hatchway (26) and the front section (16) being over an equipment access hatchway (28) of a roof compartment. The front hatch section (16) is mounted on a front roof section (10a) along its forward edge by hinges (18), and releasably latched to a middle roof section (10c) along its rearward edge by secondary latches (22). The rear hatch section (14) is mounted on the rearward edge of the front hatch section (16) by hinges (20), and releasably latched to the rear roof section (10b) by a primary latch (40). The primary catch (40) may be released and the rear hatch section (14) may be partially opened and retained with rear stays (64) to provide ventilation. The rear stays (64) may then be automatically released when the rear hatch section (14) is pushed past the retention point to fully open the escape hatchway (26). The secondary catches (22) may then be released and the front hatch section (16) opened and supported by front stays (78), to provide access to the roof compartment through the equipment access hatchway (28).

9 Claims, 6 Drawing Sheets

VEHICLE CAB WITH ROOF HATCH

CROSS REFERENCE TO RELATED APPLICATION

This application is a continuation of Ser. No. 08/040,294, filed Mar. 30, 1993, now abandoned.

This invention relates to a vehicle cab with roof hatch.

The cab roofs of some vehicles, such as tractors, generally incorporate an escape hatch by which the driver may escape from the cab if the vehicle should turn over onto its side. The hatches are generally located towards the rear of the cab roof and may usually be opened a small distance, and secured there with stays, in order to provide ventilation. In the prior art these hatches are often hinged at the rear leaving the opening facing forwards when ventilation is required. There are a number of disadvantages to such a system. When driving along with the hatch partially open it may be pulled from the stays and blown fully open, particularly at road speeds, leading to damage to the hatch, hinges and latching mechanisms. There is also danger of damage as a result of the hatch catching on overhanging branches. Further, dust and flies will be drawn into the cab, and fumes and noise from the vehicle exhaust in front of the cab will enter it, making it less comfortable for the driver.

The reason for hatches in the prior art being hinged at the rear is to provide drivers with convenient access to equipment, for instance air conditioning units, located in the forward portion of the cab roof, by means of standing on the vehicle seat with the upper body through the escape hatch. An escape hatch hinged along its forward edge would obstruct such access. The equipment located in the forward portion of the roof may be protected by means of a second hatch secured by screws, such hatches are themselves unsatisfactory since they can be difficult to seal adequately, are time consuming to remove and are no longer connected to the vehicle once removed making it possible for them to be dropped or blown away. Access via internal hatches in the ceilings of vehicle cabs is also known, however, these suffer from the disadvantage that maintenance on the equipment then has to be carried out overhead making it more difficult to accomplish. In addition if, for instance, an air conditioning filter has to be changed the dirty filter will be removed into the cab and will shed dust in the process.

It is an object of the present invention to provide a vehicle cab with a roof hatch which is hinged along its forward edge but provides convenient access to a roof compartment located in the cab roof forward of the hatch.

Thus according to the present invention there is provided a vehicle cab with a roof hatch comprising front and rear hatch sections, the rear hatch section being over an escape hatchway and the front hatch section being over a roof compartment, each hatch section having forward and rearward edges, the front hatch section being hingably mounted on the cab roof along its forward edge and releasably latched to the cab roof at its rearward edge, and the rear hatch section being hingably mounted on the rearward edge of the front hatch section by its forward edge, and being releasably latched to the cab roof at its rearward edge.

In a preferred embodiment the front hatch is releasably latched to the roof by manually releasable latching means which are exposed when the rear hatch section is open. Such a latching means may comprise at least one latch comprising an elongate resilient fastening member pivotally mounted on either the front hatch section or roof, a latching formation on the other of the front hatch section or roof, and a fastening means mounted on the same one of the front hatch section or roof as the elongate fastening member. When the latch is closed, the mid portion of the elongate fastening member engages the latching formation and the end portion remote from the pivot engages the fastening means, such that, by virtue of the resilience of the elongate fastening member, the front hatch section is biased towards the roof. The elongate resilient fastening member may be a spring bar.

In an alternative embodiment the front hatch section is releasably latched to the roof by latching means which automatically disengage when the rear hatch section is opened beyond a predetermined angle.

Embodiments of the invention may include rear stays enabling the rear hatch section to be retained in a partially open position to provide for ventilation in the cab whilst the front hatch section remains latched. The rear stays may be gas struts. The rear stays may automatically release from mounts on the roof when the rear hatch section is pushed past the partially open position to fully open escape hatchway. In such an arrangement runners may be provided on the roof which pick up the released ends of the stays as the rear hatch section is closed and provide for automatic re-engagement of the rear stays with the mounts.

Embodiments of the invention may also include front stays to support the front hatch section when it is open.

One embodiment of the invention will now be described, by way of example only, with reference to the accompanying drawings in which.

Figure 1:
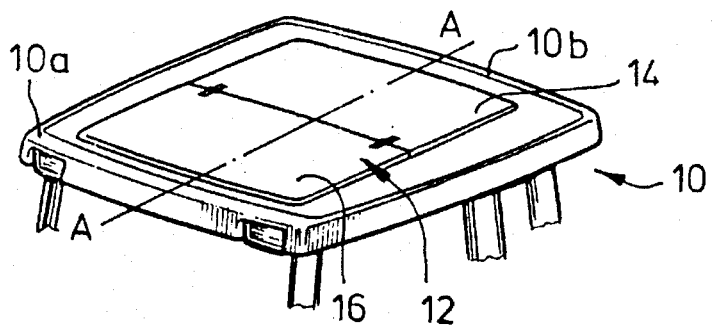
FIGS. 1, 2 and 3 are simplified views of a vehicle cab roof incorporating a hatch according to the invention which in combination indicate its basic mode of operation.
Figure 2:
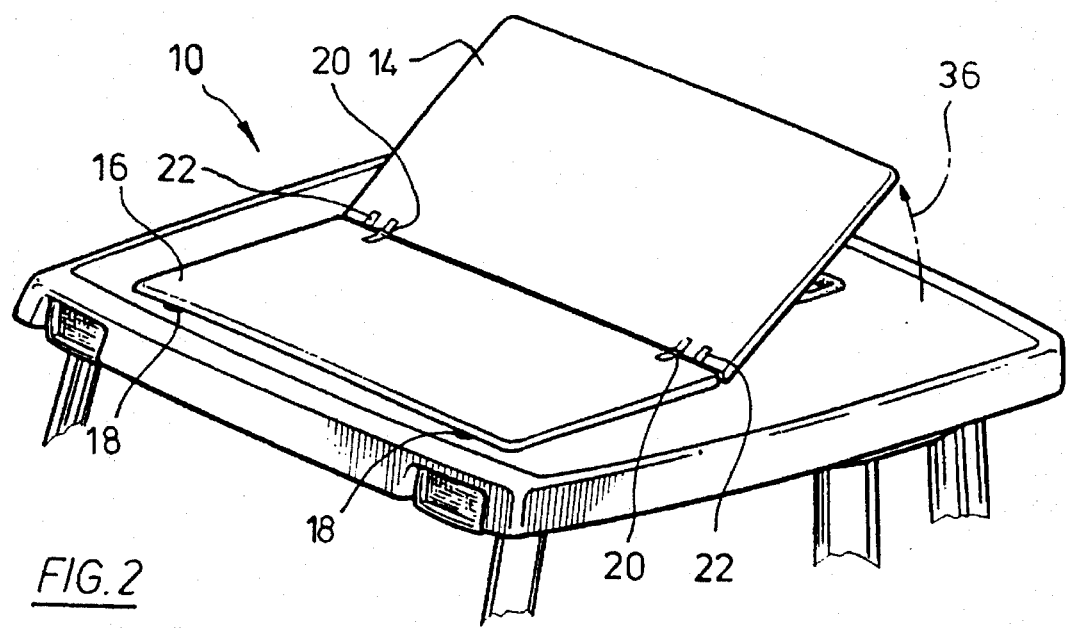
Figure 3:
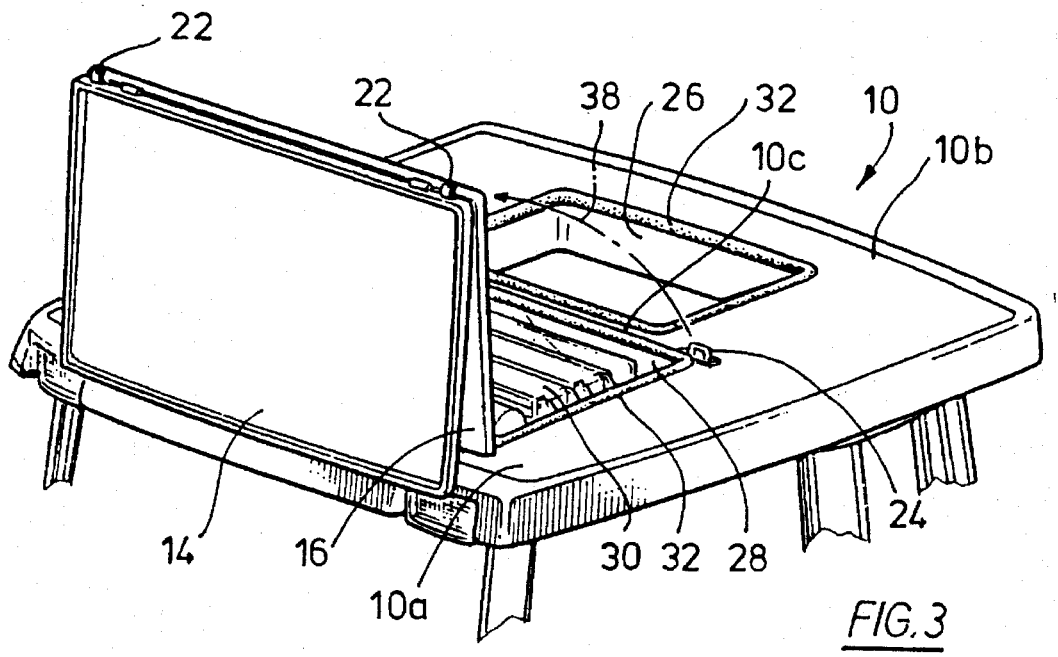

Referring now to FIGS. 1, 2 and 3, a vehicle cab roof 10, incorporating a hatch 12 according to the invention is shown, with hatch 12 closed, partially open and fully open respectively. The roof 10 has a front 10a, a rear 10b and a middle section 10c. The hatch 12 incorporates a rear hatch section 14 and a front hatch section 16. The front hatch section 16 is pivotally mounted on the front roof section 10a by front hinges 18. The rear hatch section 14 is pivotally mounted on the front hatch section 16 by rear hinges 20, and is provided with secondary catches 22 which locate in fixings 24 mounted on the middle section 10c of the roof. The rear hatch section 14 is also provided with a primary catch 40 (not shown in FIGS. 1 to 3, but shown in and described later with reference to FIG. 5) with which it may be secured to the rear section 10b of the roof.

Figure 4:
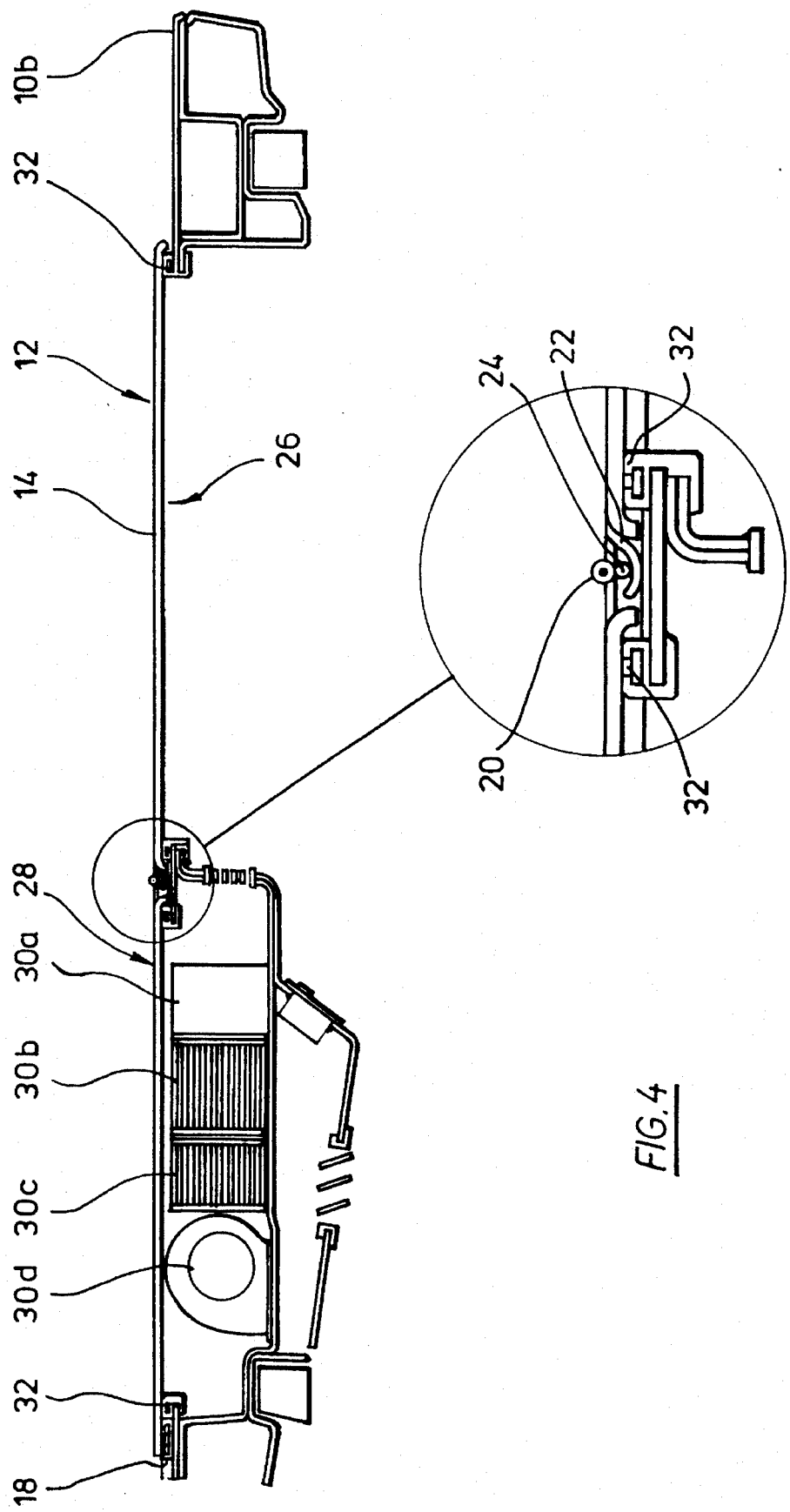
FIG. 4 is a sectional view through the mid line, running from front to rear, of the hatch of FIGS. 1, 2 and 3.

Referring now also to FIG. 4, a section through the roof 10, along the line A—A in FIG. 1, is illustrated schematically. Parts common to FIGS. 1, 2 and 3 are like referenced. When the hatch 12 is closed, the rear hatch section 14 covers an escape hatchway 26 and the front hatch section 16 covers an equipment access hatchway 28 to a roof compartment located towards the front of the roof 10a. The two hatchways 26, 28 are separated by the middle roof section 10c. The equipment access hatchway 28 may, for instance, provide access to an air conditioning system 30, such as that illustrated in FIG. 4 which includes a filter 30a, a condenser 30b, a heater matrix 30c and a blower 30d. The hatchways 26, 28 are surrounded by seals 32.

The hatch 12 operates as follows. The hatch 12 is normally secured by both primary and secondary catches 40 and 22 which retain it against seals 32, as shown in FIG. 1. If ventilation is required in the vehicle cab the primary catch 40 is released, allowing the rear hatch section 14 to pivot around the rear hinges 20. The rear hatch section 14 is then pushed upwards, as indicated by arrow 36, a short distance to a retention point where it is held by a pair of rear stays 64 (not shown in FIGS. 1 to 3, but shown in and described later with reference to FIG. 6) and provides a rearward facing opening as shown in FIG. 2. If, however, full access to the escape hatchway 26 is required, either in an emergency or to obtain access to the equipment 30, then when the retention point is reached the rear hatch section 14 is given a hard push and the rear stays release allowing the rear hatch section 14 to open fully. That is to open until it is lying back against the front hatch section 16. At this point full access to the escape hatchway 26 is provided. However, as the rear hatch section 14 swings over towards the front hatch section 16 the secondary catches 22 release from the fixings 24 allowing the front hatch section 16 to pivot around the front hinges 18. The front hatch section 16 may then be lifted up, pivoting around the front hinges 18, as indicated by arrow 38, until it reaches the position shown in FIG. 3 where it is retained by a pair of front stays 78 (not shown in FIGS. 1 to 3, but shown in and described later with reference to FIG. 7). In this position the rear hatch section 14 hangs downwards from the rear hinges 20 and full access to both hatchways 26, 28 is provided.

Figure 5:
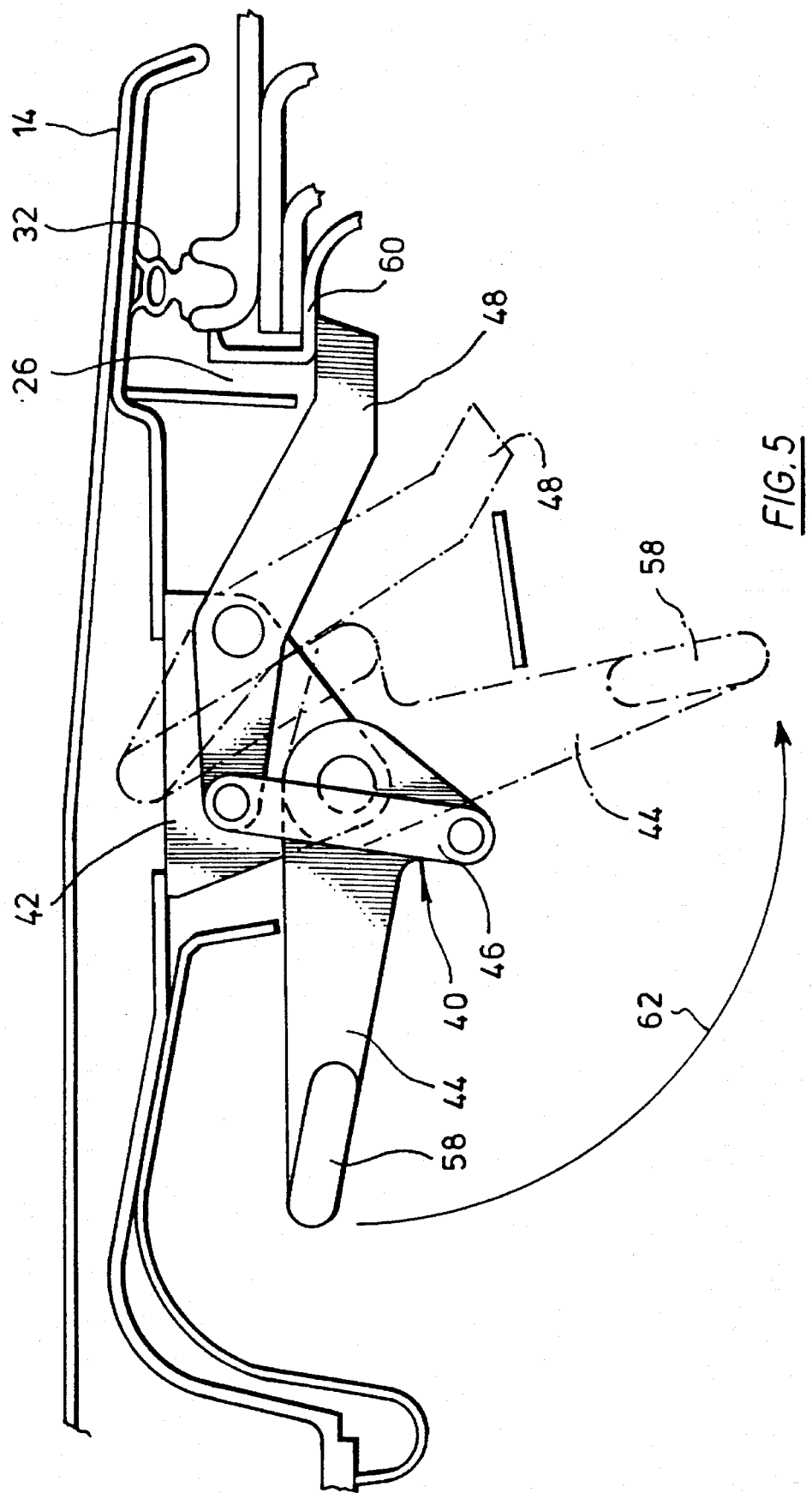
FIGS. 5, 6 and 7 are schematic illustrations of a primary catch, a rear stay and a front stay for use in the hatch of FIGS. 1, 2 and 3.

Referring now to FIG. 5, half of an example of a primary catch 40 suitable for use with a hatch 12 of the invention is illustrated schematically. The primary catch 40 is symmetrical with respect to the line A—A in FIG. 1, and is located symmetrically with respect to the line A—A and towards the rear of rear hatch section 14. FIG. 5 illustrates the catch 40 to one side of the line A—A. The following description refers to the illustrated half of the catch 40, it applies equally to the other half. The catch 40 is retained on hatch section 14 by a bracket 42. The catch 40 comprises first and second levers 44 and 48 interconnected by a link 46. The first lever 44 is substantially L shaped, bears a grab handle 58 adjacent to one end and substantially perpendicular to its length and is pivotally mounted on bracket 42, at the elbow of the L. The grab handle 58 extends between the first lever 44 and the corresponding lever in the other half of the catch. The second lever 48 is pivotally mounted on bracket 42 intermediate its two ends.

When the hatch 12 is shut, and is retained against the seals 32 by the primary catch 40, the catch is positioned as indicated by the solid lines. The second lever 48 is positioned such that one end is engaged against an edge 60 of the escape hatchway 26. To open the rear hatch section 14 the primary catch 40 must be released. This is achieved by holding grab handle 58 and pulling downwards, such that lever 44 pivots anticlockwise causing link 46 to move upwards, causing clockwise pivoting of lever 48 thus disengaging edge 60. The position of catch 40 when released is illustrated in FIG. 5 by chain lines.

Figure 6:
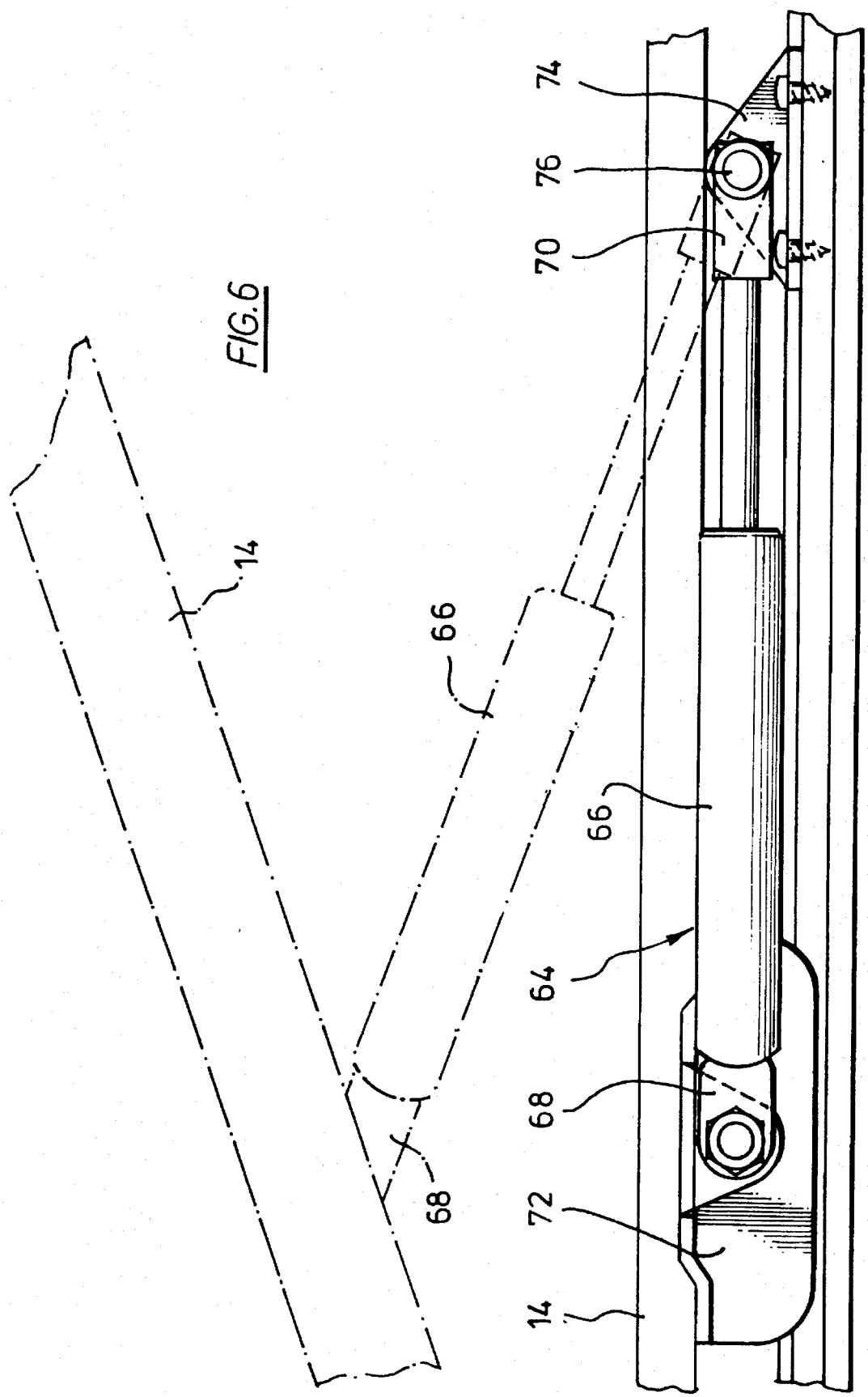

Referring now to FIG. 6, a form of rear stay 64 suitable for use in the hatch 12 is illustrated schematically. The rear stay 64 comprises a gas strut 66, with first and second fixings 68, 70 at its ends. First and second fixing brackets 72, 74 are provided, attached to the rear hatch section 14 and the roof 10 adjacent the escape hatchway 26 respectively. The first fixing 68 is bolted to the first fixing bracket 72. The second fixing 70 engages as a snap fit with a pin 76 incorporated on the second fixing bracket 74.

The rear stay 64 operates as follows. When the rear hatch section 14 is raised to the ventilation position the gas strut 66 extends, as illustrated by chain lines in FIG. 6, to support the rear hatch section 14 in that position. When the rear hatch section 14 is pushed hard from the ventilation position the second fixings 70 snap Loose from the pins 76 allowing the rear hatch section 14 to swing over to rest on the front hatch section 16. The rear stays 64 may be provided with runners (not shown), extending along the sides of the hatchway 26, which provide for automatic re-engagement of the fixings 70 and pins 76, alternatively they may be re-engaged manually.

Figure 7:
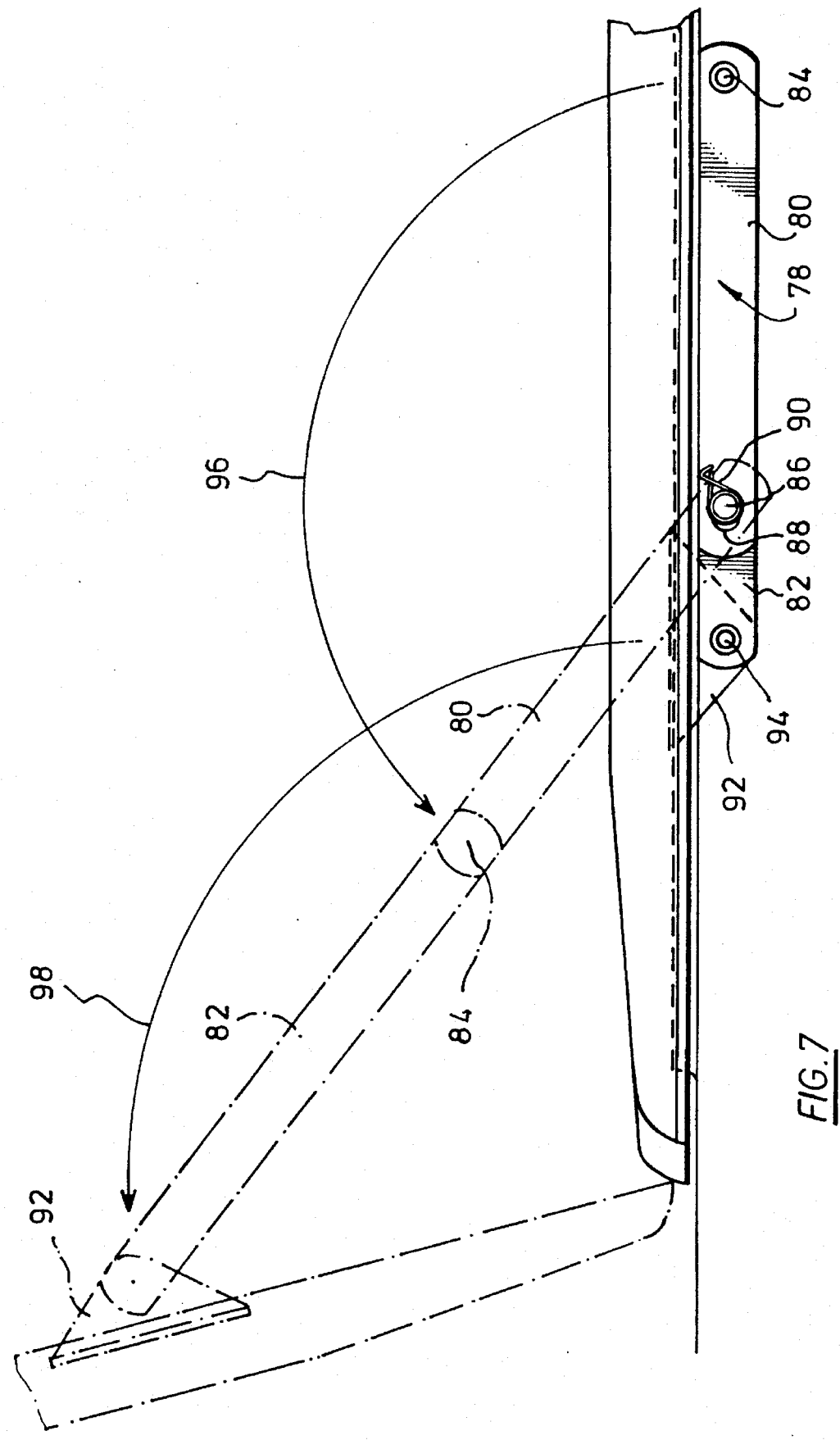

Referring now to FIG. 7, a front stay 78 for use in the hatch 12 is illustrated schematically. The front stay 78 comprises first and second links 80, 82 interconnected by a pin 84. A pin 86 is provided, attached to the roof 10 via a bracket (not shown), adjacent the equipment access hatchway 28. One end of link 80 includes an oval hole 88 which is located on pin 86, link 80 being retained on pin 86 by a spring clip 90. A fixing bracket 92 is provided on front hatch section 16 to which link 82 is pivotally connected by a pin 94.

The front stay 78 operates as follows. When hatch section 16 is closed the front stays 78 are folded, as shown in solid lines in FIG. 7, and lie just inside the equipment access hatchway 28 substantially parallel with the roof 10. When the secondary catches 22 are released and hatch section 16 is raised as shown in FIG. 3, the stays 78 unfold and straighten out as shown in chain lines in FIG. 7. To do this link 80 pivots around pin 86 and pin 84 performs an arc as illustrated by arrow 96, at the same time link 82 pivots around pin 94 which itself performs an arc as illustrated by arrow 98.

Figure 8:
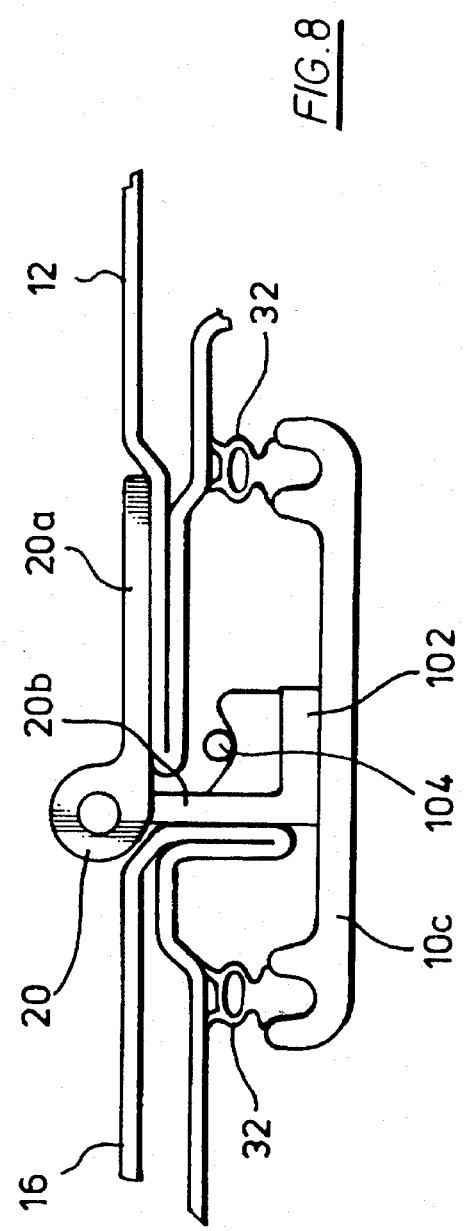
FIG. 8 is a section through an alternative form of front hinge for use in the hatch of FIGS. 1, 2 and 3.
Figure 9:
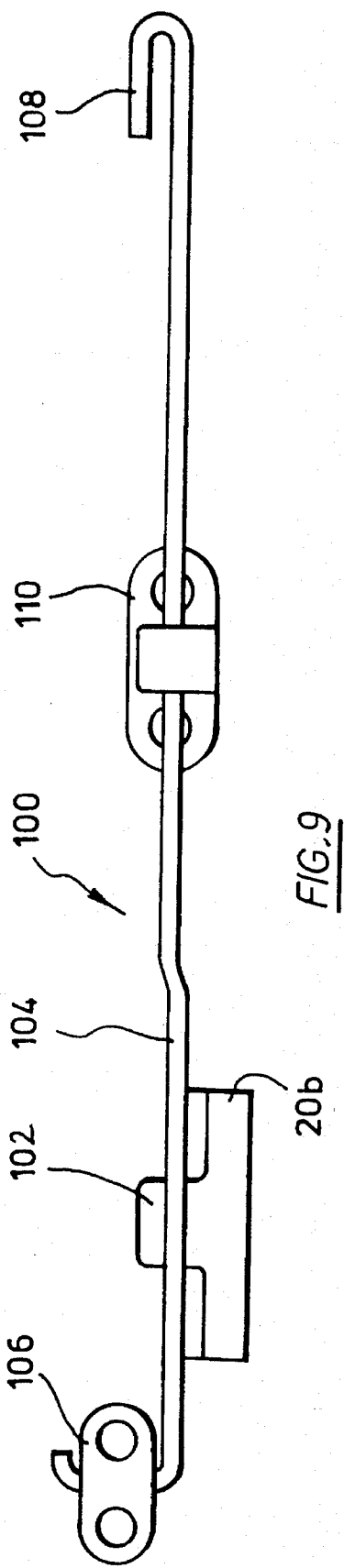
FIG. 9 is a schematic illustration of an alternative form of secondary catch for use with the hinge of FIG. 8.

Referring now to FIGS. 8 and 9, an alternative form of secondary catch 100 is illustrated. FIG. 8 shows a section through a rear hinge 20 and secondary catch 100. FIG. 9 shows a simplified plan view of the secondary catch 100 when closed. In use two secondary catches 100 are located on hatch 12, one to either side of the centre in a similar manner to secondary catches 22 in FIGS. 1 to 3. The rear hinge 20 comprises a first portion 20a rigidly mounted on the rear hatch section 14 and a second portion 20b rigidly mounted on the front hatch section 16. The secondary catch 100 includes a tongue 102 formed as an extension to the second hinge portion 20b and extending along the middle section of the roof 10c. It also includes a spring bar 104, a first end of which is pivotally mounted on the middle roof section 10c by a bracket 106, and a second end of which is free and forms a loop 108. A hook fixing 110 mounted on the middle roof section 10c completes the catch 100. The two catches 100 are oriented such that bracket 106 is, in each case, located towards the outside edge of the roof 10 with spring bar 104 lying towards the centre. The secondary catch 100 retains the front hatch section 16 by means of applying downward pressure on the tongue 102 which is rigidly fixed to the front hatch section 16 via the hinge 20. To do so the spring bar 104 is shaped appropriately such that, when it is in the position illustrated in FIG. 9, downward pressure is applied to the tongue 102 and the spring bar is forced upwards into the hook of the hook fixing 110.

The secondary catch 100 does not release automatically as described for the secondary catch 22. Instead as the rear hatch section 14 is pivoted around the rear hinge 20 and swings back to lie on the front hatch section 16 the secondary catch 100 is exposed, and may then be released. To release it the loop 108 on the second end of the spring bar 104 is pushed downwards towards the middle roof section 10c and the spring bar 104 disengaged from the hook fixing 110. The spring bar 104 is then pivoted about the bracket 106 to disengage tongue 102 and the spring bar 104 is rested along the middle roof section 10c. The tongue 102 is thus freed and the front hatch section 16 is released.

The secondary catch 100 provides the advantage that the rear hatch section 14 cannot be closed and latched unless the front hatch section 16 is closed and latched. This is because when the secondary catch 100 is released the spring bars 104 extend outside the width of the hatch sections 14, 16 and foul the hatch sections if they are closed.

It will be appreciated that the invention provides the advantage that the rear hatch section may be opened to provide ventilation and the opening so provided faces towards the rear of the vehicle. Thus overhanging branches ride up and over the open hatch section without causing damage, the hatch is not blown fully open at road speeds, flies and dust are not drawn into the cab and fumes and noise from the exhaust in front of the cab do not readily enter it. It will also be appreciated that the invention provides the further advantage that the front and rear hatch sections may both be opened providing easy access to a roof compartment such as may house an air conditioning system or other equipment.

We claim:

1. A vehicle cab and roof hatch assembly comprising:
   a vehicle cab including a roof defining a first portion and a second portion, said vehicle cab having openings formed therethrough;
   a roof hatch for selectively covering said openings, said roof hatch including:
     a first hatch section having a first edge and a second edge;
     a first hinge connected between said first edge of said first hatch section and said roof for permitting pivoting movement of said first hatch section between a first position, wherein said first hatch section is disposed adjacent to said first portion of said roof and over a first of said openings, and a second position, wherein said first hatch section extends upwardly from said roof;
     a second hatch section having a first edge and a second edge;
     a second hinge connected between said second edge of said first hatch section and said first edge of said second hatch section for permitting pivoting movement of said second hatch section relative to said first hatch section between a closed position, wherein said second hatch section is disposed adjacent to said rear portion of said roof and over a second of said openings, and an open position, wherein said second hatch section is disposed adjacent to said first hatch section; and
     a stay for selectively supporting said second hatch section in a position which is intermediate of said closed and open positions for providing ventilation through said opening; said second hatch section having catch structure allowing pivotal movement of the second hatch section for ventilation while retaining the first hatch section in the first position.

2. The vehicle cab and roof hatch assembly defined in claim 1 wherein said stay includes a first end which is connected to said second hatch section and a second end which is connected to said roof.

3. The vehicle cab and roof hatch assembly defined in claim 2 wherein one of said first and second ends of said stay is releasable to permit said second hatch section to be moved to said open position.

4. The vehicle cab and roof hatch assembly defined in claim 1 wherein said stay includes a gas strut connected between said second hatch section and said roof.

5. The vehicle cab and roof hatch assembly defined in claim 1 wherein said stay is a first stay, and further including a second stay for selectively supporting said first hatch section in said second position.

6. A vehicle cab and roof hatch assembly comprising:
   a vehicle cab including a roof defining a forward portion and a rearward portion, said vehicle cab having openings formed therethrough;
   a roof hatch for selectively covering said openings, said roof hatch including:
     a forward hatch section having a forward edge and a rearward edge;
     a forward hinge connected between said forward edge of said forward hatch section and said roof for permitting pivoting movement of said forward hatch section between a first position, wherein said forward hatch section is disposed adjacent to said forward portion of said roof and over a first of said openings, and a second position, wherein said forward hatch section extends upwardly from said roof;
     a rearward hatch section having a forward edge and a rearward edge;
     a rearward hinge connected between said rearward edge of said forward hatch section and said forward edge of said rearward hatch section for permitting pivoting movement of said rearward hatch section relative to said forward hatch section between a closed position, wherein said rearward hatch section is disposed adjacent to said rear portion of said roof and over a second of said openings, and an open position, wherein said rearward hatch section is disposed adjacent to said forward hatch section;
     a forward stay for selectively supporting said forward hatch section in said second position; and
     a rearward stay for selectively supporting said rearward hatch section in a position which is intermediate of said closed and open positions for providing ventilation through said opening; said rearward hatch section having catch structure allowing pivotal movement of the rearward hatch section for ventilation while retaining the forward hatch section in the first position.

7. The vehicle cab and roof hatch assembly defined in claim 6 wherein said rearward stay includes a first end which is connected to said rearward hatch section and a second end which is connected to said roof.

8. The vehicle cab and roof hatch assembly defined in claim 7 wherein one of said first and second ends of said rearward stay is releasable to permit said rearward hatch section to be moved to said open position.

9. The vehicle cab and roof hatch assembly defined in claim 6 wherein said rearward stay includes a gas strut connected between said rearward hatch section and said roof.

* * * * *